Sept. 9, 1930.  C. B. BAILEY  1,775,153
GASKET
Filed Sept. 23, 1927
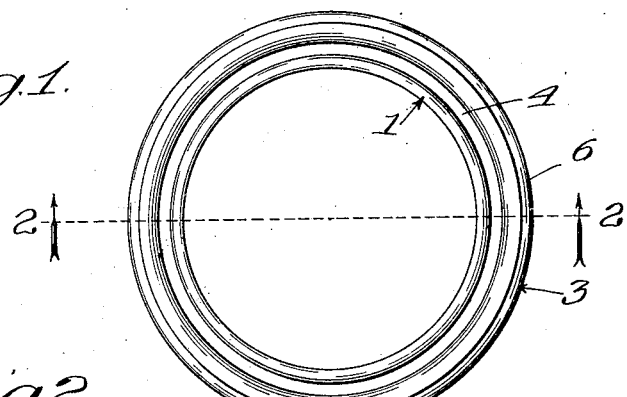
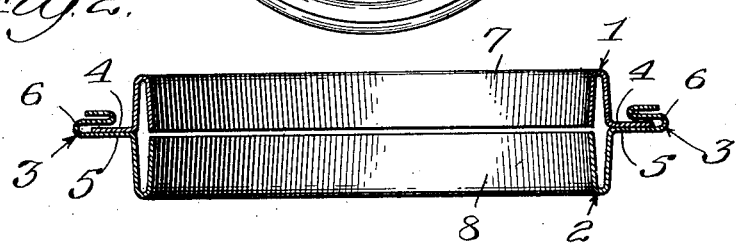
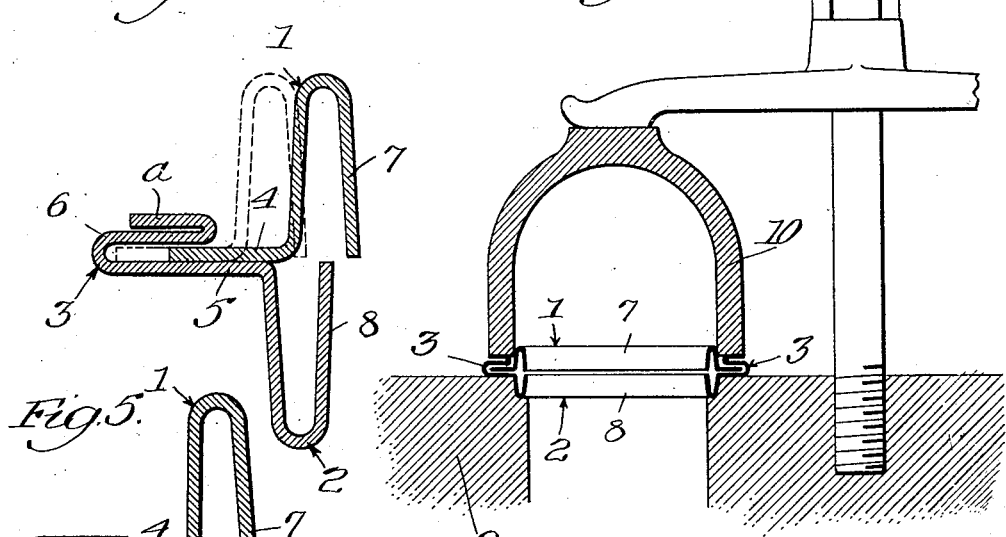
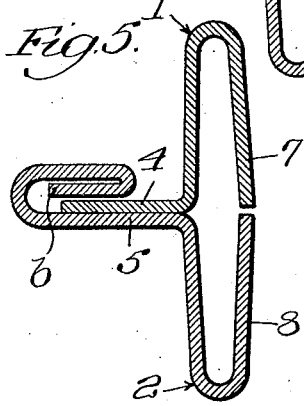
Inventor:
Claude B. Bailey,
By Eugene Curran
Atty.

Patented Sept. 9, 1930

1,775,153

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed September 23, 1927. Serial No. 221,492.

The prior patents to Joseph Holle and myself Nos. 1,387,648 and 1,524,682, respectively, show copper-asbestos gaskets with tubular guides on opposite sides thereof as heretofore manufactured and as most generally used between manifold pipes and the cylinder blocks of automobile engines. In these gaskets, the tubular guides are fixed with respect to each other and can not be adjusted to take care of warped or distorted manifold pipes. These pipes, especially the exhaust ones, become warped and distorted due to the excessive heats to which they are subjected when in use, and thus their ends at the cylinder blocks are thrown out of line with the ports in the blocks. When the engine is new, the manifold pipes align with the cylinder ports, and the patented gaskets may be effectively used as the guides then properly enter and fit within the pipes and the cylinder ports, respectively. When replacing the gaskets, however, it may be found that the guides do not enter and fit properly within the pipes and ports, due to the warping or distortion of the pipes. This makes it difficult to fit new gaskets, with the result that tight, leak proof joints are not always obtainable. The asbestos rings which are used in these gaskets to provide the pressure receiving portions thereof allow the manifold pipes to warp or distort and thus become out of line with their respective cylinder block ports. These rings are relatively thick and are compressible. Due to the excessive cushion which they afford, the pipes clamped against the rings may readily warp, expand or contract under the heat conditions to which the pipes are subjected while in use.

In accordance with my invention, the pressure receiving portion of the gasket is made entirely of sheet metal, thereby providing a metal to metal contact for the parts between which the gasket is clamped and thus avoid the tendency for either one or both of such parts to warp or distort. Furthermore, the tubular guides are made adjustable with respect to each other in the plane of the opening in the gasket and thus permit the gasket to be adjusted for either new or warped or distorted manifold pipes.

The invention consists further in the matters hereinafter described and claimed.

In the accompanying drawings—

Fig. 1 is a plan view of a gasket constructed in accordance with my invention;

Fig. 2 is an enlarged cross-sectional view taken on line 2—2 of Fig. 1 with the guides shown in alignment;

Fig. 3 is a smaller sectional view showing one guide adjusted with respect to the other;

Fig. 4 is a view showing one of the gaskets of my invention clamped in place between an engine block and an associated manifold pipe; and Fig. 5 shows a modified form of construction to be hereinafter described.

The gasket of my invention is made entirely of sheet metal, such as copper, brass, aluminum, zinc, steel, etc., and has tubular guides 1, 2 on opposite sides of a pressure receiving portion 3. The gasket is made in two annular parts with a tubular guide and a part of the pressure receiving portion incorporated in each part. These parts have overlapping flanges 4, 5, which are at the bases of the respective guides 1, 2 and extend laterally outward therefrom entirely around the guides. The flanges 4, 5 are held in contact by the outer marginal portion 6 of the flange 5 being bent over the outer edge of the flange 4, as shown in Fig. 2.

The flange 5 is made considerably wider than the flange 4, and the bent over marginal portion 6 extends back far enough over the flange 4 so that the guide 1 may be adjusted laterally with respect to the guide 2 without the flange 4 leaving the folded over margin 6 of the flange 5 at any point in the circumference of the flange. Thus the two annular parts of the gasket will be held together and the guides 1, 2 may be adjusted with respect to each other as may be required to take care of a warped or distorted manifold pipe. The folded over portion 6 of the flange 5 is pressed just tight enough against the flange 4 to hold the two parts of the gasket together and maintain the flanges 4, 5 in sliding contact so that the guides may be adjusted as described.

The guides 1, 2 are strengthened against bending by inturned flanges 7, 8 on their inner sides. These flanges have a foldable connection with the outer edges of the guides, and in the particular gasket shown the flanges extend toward each other with their inner edges close together but sufficiently spaced apart so as not to interfere with or hinder the sliding or adjustment of one guide with respect to the other.

As shown in Fig. 2, the marginal portion 6 of the flanges 5, after being folded over the outer edge of the flange 4 to engage it, may be folded on itself one or more times to provide the number of metal layers required for the all-metal pressure receiving portion 3 of the gasket. Instead of folding this section outwardly, as at *a* in Fig. 2, it may be folded inwardly, as at *b* in Fig. 5. The adjustable guide feature remains the same in both structures.

In Fig. 4 I have shown my improveed gasket clamped in place between a cylinder block 9 and a manifold pipe 10. With the guides 1, 2 adjustable, they may be readily slid with respect to each other so as to properly enter warped or distorted ports and thus enable the replacement of gaskets without sacrificing tight joints.

The details of structure shown and described may be variously changed and modified without departing from the spirit and scope of my invention.

I claim as my invention:

A gasket made entirely of sheet metal and consisting of two separately formed annular sections, each section having a tubular guide portion and an outwardly extending lateral flange at the base of the guide portion, said sections being arranged with their base flanges in sliding contact and with their tubular guides on opposite sides of the same, one of said base flanges being made wider than the other and having its outer marginal portion folded over the other base flange for holding the base flanges together and permitting one guide to be adjusted with respect to the other in the plane of said flanges, and strengthening flanges carried by the guides on the inside thereof, said flanges extending toward each other and terminating short of each other at their opposed ends so that the flanges may pass in the adjustment of the sections.

In testimony whereof I affix my signature.

CLAUDE B. BAILEY.